United States Patent [19]
Ortmann

[11] Patent Number: 5,577,584
[45] Date of Patent: Nov. 26, 1996

[54] MULTIPLE PRESSURE-TO-CURRENT RELATIONS IN A SYSTEM HAVING A SOLENOID-OPERATED HYDRAULIC VALVE

[75] Inventor: Walter J. Ortmann, Ypsilanti, Mich.

[73] Assignee: Ford Motor Company, Dearborn, Mich.

[21] Appl. No.: 316,964

[22] Filed: Oct. 3, 1994

[51] Int. Cl.⁶ .............................. F16D 25/00; F16D 25/10
[52] U.S. Cl. .......................... 192/85 R; 192/87.13; 192/87.18; 192/104 F; 192/109 F
[58] Field of Search .................. 192/85 R, 109 F, 192/3.58, 87.1, 87.13, 87.16, 87.18, 103 F, 104 F

[56] References Cited

U.S. PATENT DOCUMENTS

| | | | |
|---|---|---|---|
| 3,004,447 | 10/1961 | Sand | 192/85 R |
| 3,625,322 | 12/1971 | Nagamatsu et al. | 192/104 F |
| 3,674,121 | 7/1972 | Copeland | 192/85 R |
| 3,799,308 | 3/1974 | Erisman | 192/109 F |
| 4,066,006 | 1/1978 | Heiser | |
| 4,073,203 | 2/1978 | Wurst et al. | |
| 4,094,211 | 6/1978 | Espenschied | |
| 4,478,237 | 10/1984 | Blake et al. | 192/85 R |
| 4,577,143 | 3/1986 | Eschrich et al. | |
| 4,676,349 | 6/1987 | Coutant | 192/87.1 |
| 4,883,092 | 11/1989 | Rub | 192/87.18 |
| 5,115,722 | 5/1992 | Ichihashi et al. | 192/109 F |

*Primary Examiner*—Andrea L. Pitts
*Attorney, Agent, or Firm*—Frank G. McKenzie; Roger L. May

[57] ABSTRACT

A regulator valve (14) includes a valve spool (30) biased in a valve chamber (32) by control pressure whose magnitude is determined by operation of a variable force solenoid (42), first and second control areas (28, 26) exposed to friction element pressure. A shift valve (16) includes a spool having multiple control lands (66, 68), the position of spool determined by the state of an on/off solenoid (70). The shift valve produces high and low hydraulic pressure operative to open and close line pressure or a vent to a hydraulically-activated clutch.

12 Claims, 2 Drawing Sheets

MULTIPLE PRESSURE-TO-CURRENT RELATIONS IN A SYSTEM HAVING A SOLENOID-OPERATED HYDRAULIC VALVE

BACKGROUND OF THE INVENTION

1. Field of the Invention

This invention relates to the field of hydraulic systems for controlling operation of friction elements of an automatic transmission. More particularly, the invention pertains to an hydraulic system that produces multiple relationships between the pressure in a friction element and electrical current supplied to a solenoid-operated valve.

2. Description of the Prior Art

Automatic transmissions for automotive vehicles usually include a planetary gear unit, which controls the ratio of input speed to output speed of the transmission. The gear ratio is switched by selectively braking, or holding against rotation, the sun gear, planet pinion carrier, or ring gear of the planetary gear unit, or by driveably connecting these elements to those of another gear unit. Clutch engagement and braking is effected usually by hydraulically-operated clutches or brakes, including brake bands. A selected gear is engaged by selectively holding against rotation or driveably connecting components of the gearset. In making these gear ratio changes, variable force solenoids are often used to control the magnitude of hydraulic pressure in the ongoing and offcoming friction elements.

Generally, variable force solenoids operated in conjunction with a regulator valve to produce one predetermined relationship of hydraulic pressure in the friction element to the magnitude of electrical current supplied to the solenoid that controls the position of the regulator valve. However, the magnitude of torque transmitted between ongoing and oncoming friction elements varies with a number of factors that include engine speed, throttle position, and gear ratios.

SUMMARY OF THE INVENTION

It is an advantage of this invention that more than one current-to-pressure gain relationship is produced from one variable force solenoid in order to adapt friction element pressure more precisely to torque requirements of specific gear ratio changes. An object of this invention is to provide an hydraulic system that produces this advantage.

In realizing this object and advantage an hydraulic system for controlling pressure in an friction element of an automatic transmission includes a source of regulated line pressure, a source of regulated feed pressure supplied to various solenoid-operated valves, a low pressure vent such as the transmission oil sump. A solenoid-operated pressure control valve, hydraulically connected to the source of feed pressure and vent, responds to current supplied to the solenoid to produce a first control pressure. A shift valve, hydraulically connected to the friction element, alternately opens and closes a connection between the friction element and a regulator valve. A regulator valve having a first control area continually connected hydraulically to the friction element, a second control area connected hydraulically to the shift valve, and a third control area connected to first control pressure, responds to pressure forces on the first, second and third control areas to modulate friction element pressure by opening and closing a first connection between the friction element and line pressure source and a second connection between the friction element and vent.

DESCRIPTION OF THE PREFERRED EMBODIMENT

Figure 1:
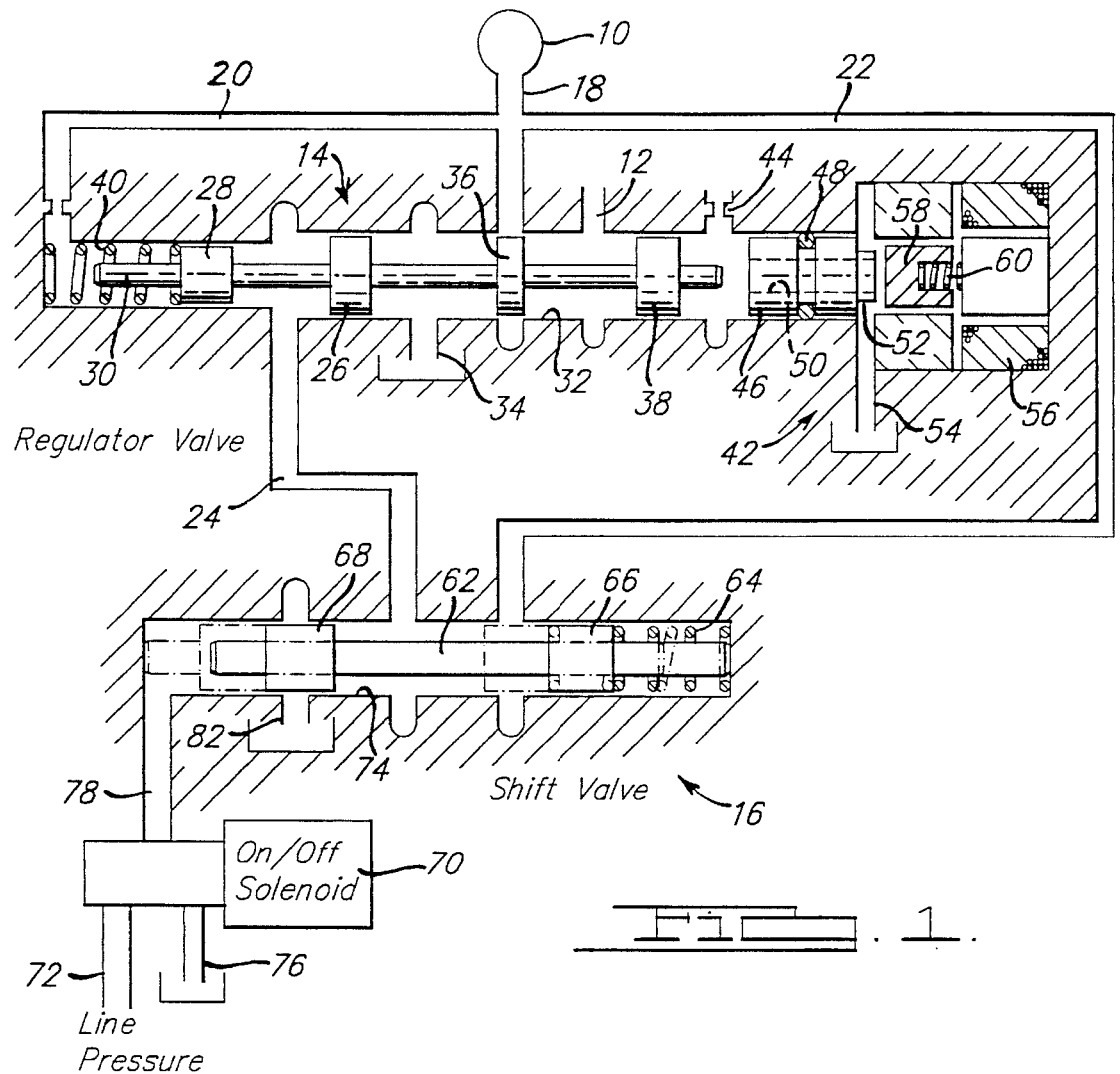
FIG. 1 is a schematic diagram of a portion of an hydraulic circuit including a multiple gain regulator valve and shift valve.

Referring first to FIG. 1, the magnitude of hydraulic pressure in the piston of an hydraulically-actuated friction clutch, brake, or brake servo 10 is controlled from a source of line pressure 12 through use of a multiple-gain regulator valve 14 and shift valve 16. Friction element 10 is supplied with pressurized hydraulic fluid through line 18 from regulator valve 14. Feedback passage 20 supplies control pressure to a first control area at the left-hand end of valve 14 and line 22 carries clutch pressure to shift valve 16. Line 24 connects the output produced by valve 16 to a space between control lands 26, 28 formed on the spool 30 of regulator valve 14. The differential pressure area of lands 26, 28 comprises a second control area. Chamber 32 of regulator valve 14 is connected through a passage 34 to a low pressure vent or sump.

Spool 30 includes a control land 36, which opens and closes a connection between line pressure source 12 and friction element 10, and closes and opens a connection between vent port 34 and the friction element as spool 30 moves in chamber 32 in response to the various control pressure forces applied to it. A pressure force developed on the right-hand face, the third control area, of control land 38, the pressure force developed on control lands 26, 28, and the force of compression spring 40 on the left-hand end of control land 28 determine the position of spool 30 within the valve chamber 32.

The magnitude of control pressure on the right-hand face of control land 38 is established through operation of a flapper valve 42, wherein pressurized hydraulic fluid is supplied through a fixed upstream orifice 44 from a solenoid feed pressure source whose output pressure is regulated to a predetermined magnitude.

A fitting 46, sealed by an O-ring 48 in the valve chamber 32, includes a passage 50 connecting the solenoid feed pressure source through a downstream orifice 52 to a vent passage 54. The armature of a solenoid 56 is supplied with a variable electrical current to move the armature 58 axially toward and away from the orifice 52, thereby changing the size of the downstream orifice and modulating the control pressure at the right-hand end face of land 38. A compression spring 60 forces armature 58 toward orifice 52. The variable orifice size is determined from the balance of forces that are produced by hydraulic pressure, the force of spring 60, and the electromagnetic force produced by energizing the solenoid. For example, if the magnetic force is increased, the armature moves axially to increase the size of the opening at orifice 52. The increased size of orifice 52 causes control pressure on land 38 to decrease by opening the size of the passage to vent 54. The location of the armature is a function of the magnitude of electrical current supplied to the solenoid; therefore, the control pressure on land 38 is controlled by controlling the magnitude of electrical current supplied to the solenoid 56.

Shift valve 16 includes a valve spool 62, whose axial position within the valve chamber is determined by the relative magnitudes of the force of spring 64, which bears on control land 66, and a pressure force developed on the left-hand face of control land 68. An on-off solenoid 70 alternately opens a connection between a source of line pressure in passage 72 to the valve chamber 74 and connects passage 72 to a vent port 76. When the spool 62 of valve 16 is in the first position, shown in solid lines, i.e., when control pressure in passage 78 is high, clutch pressure is connected through passage 22, valve 16, and passage 24 so that a differential pressure force is developed on the second control area of spool 30 of regulator valve 14. Clutch pressure is also carried through passage 20 to land 28 so that a net pressure on spool 30, equal to the cross sectional area of land 26 and multiplied by the magnitude of clutch pressure, adds to the effect of spring 40 in opposition to the control pressure on land 38.

When the pressure produced by solenoid 70 is low, spool 62 of shift valve 16 moves to the second position, the position shown in phantom lines. With valve 16 so disposed, clutch pressure is blocked by control land 66, and passage 24 is connected through valve 16 to the vent port 82. Therefore, when pressure in passage 78 is low, regulator valve 14 has no effective second control pressure area, i.e., the pressure in the space between lands 26, 28 is low.

For a given magnitude of control pressure on the right-hand face of land 38, spool 30 moves leftward to a position that opens the line pressure source at passage 12 to the clutch 10. However, when pressure in passage 78 is high, two control pressure areas, those areas at the left-hand side of lands 26 and 28, are effective and cause spool 30 to move further rightward, tending to close more completely the connection between the line pressure source and clutch and to open more fully the connection between the clutch and vent port 34. Accordingly, clutch pressure is relatively lower when the first and second control areas are pressurized and effective, and relatively higher when only the first control area, but not the second control area, is effective.

Figure 2:
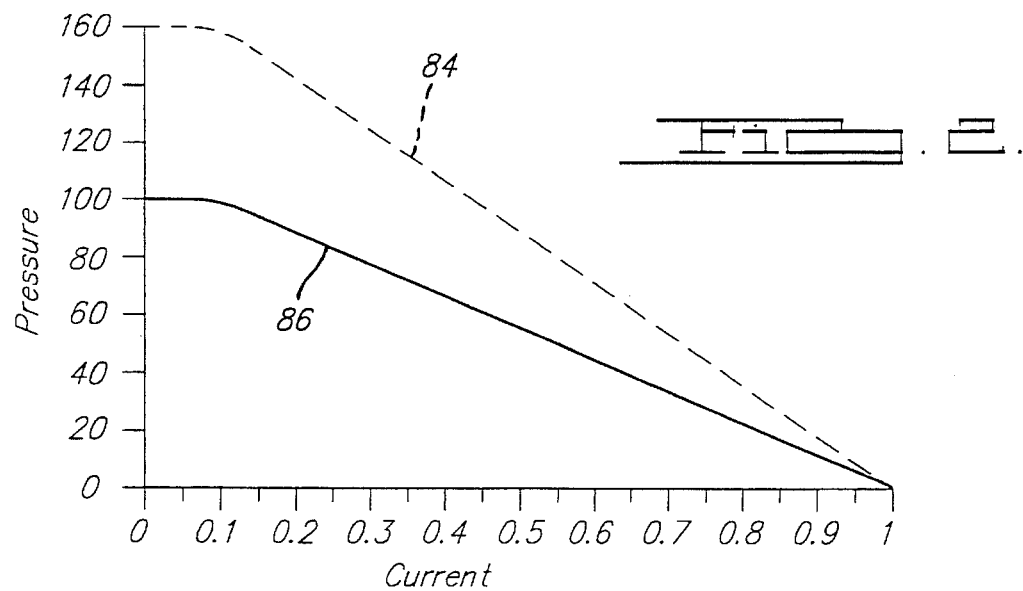
FIG. 2 is a graph showing two schedules relating clutch pressure and the electric current supplied to the variable force solenoid of FIG. 1.

The hydraulic clutch pressure to current gain when shift valve 16 is in position one, is less than that when valve 16 is in position two. Therefore, two pressure-to-current relationships are produced, as illustrated in FIG. 2. The exact pressure-to-current relationship is determined by the cross sectional areas of the control lands and the relative magnitude of the control pressure on lands 26, 28 compared to that on land 38. In FIG. 2, the upper curve 84 represents clutch pressure corresponding to shift valve 16 operating in position two; the lower curve 86 represents the relationship when valve 16 is in position one.

Figure 3:
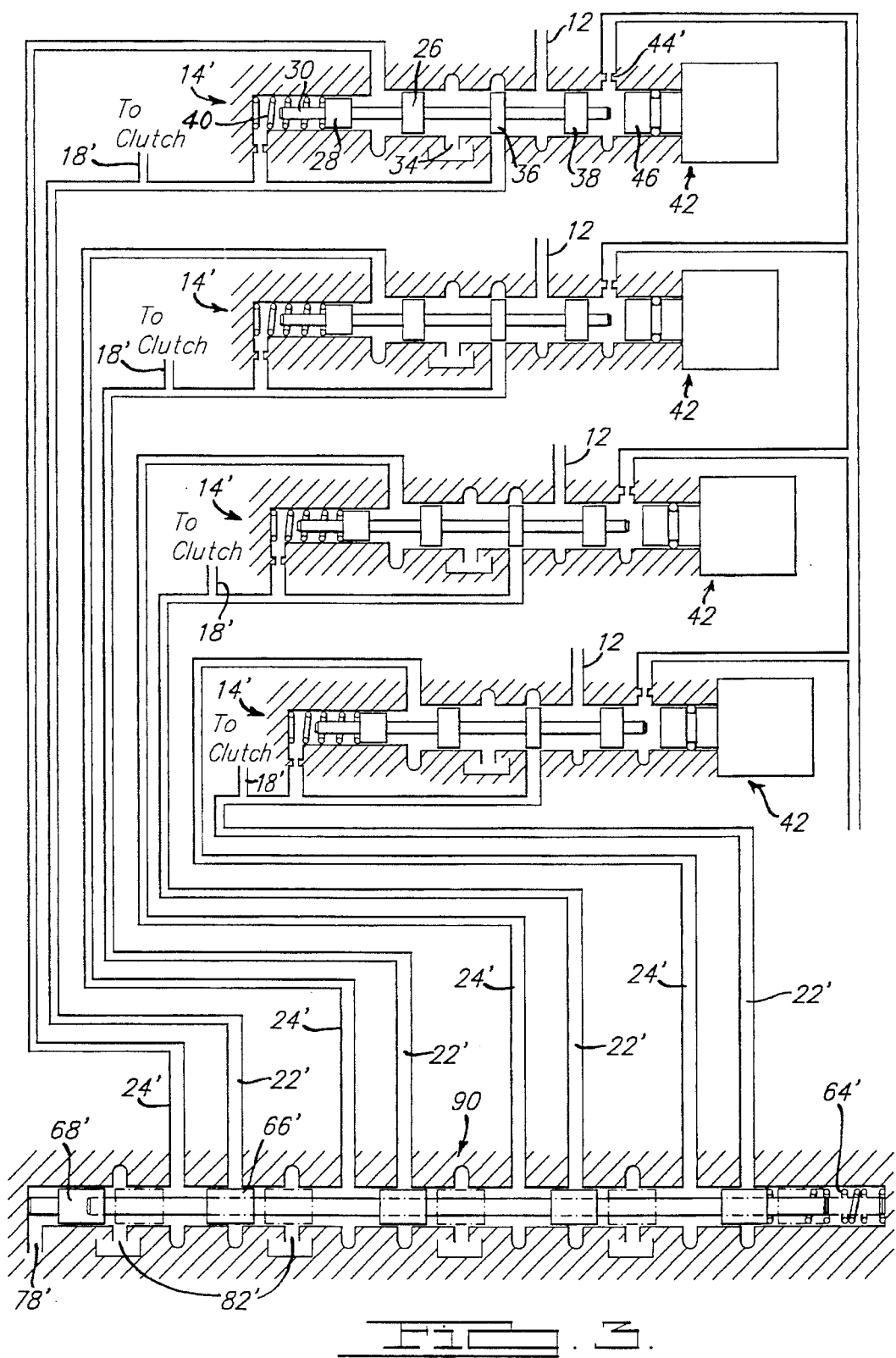
FIG. 3 is a schematic diagram of an hydraulic system having multiple gain pressure regulation applied to several friction elements.

FIG. 3 shows a hydraulic system in which a shift valve 90 is used with four regulator valves 14', each regulator valve controlled by a variable force solenoid-operated flapper valve 42' to control the magnitude of hydraulic pressure applied to a friction element through a passage 18'. Each of the regulator valves 14' is substantially identical to the regulator valve described with reference to FIG. 1. The shift valve 90 includes four pairs of control lands 66', 68', each pair associated with a regulator valve 14' Passage 78' is pressurized and vented through operation of an on/off solenoid 70 through operation of a control system that energizes and deenergizes the solenoid to change the position of spool 62' in the chamber of valve 90.

While the preferred embodiment of the present invention has been disclosed and described in detail, further modifications, enhancements, and embodiments are contemplated to be within the spirit and scope of the present invention and the following claims.

I claim:

1. A system for controlling pressure in an hydraulically actuated friction element, comprising:

a source of regulated line pressure;

a source of regulated feed pressure;

a low pressure vent;

a solenoid-operated pressure control valve hydraulically connected to the source of feed pressure and vent, responsive to current supplied to the solenoid for producing a first control pressure;

a shift valve hydraulically connected to the friction element, for alternately opening and closing a connection between the friction element and a regulator valve; and a regulator valve having a first control area continually connected hydraulically to the friction element, and a second control area connected hydraulically to the shift valve, responsive to the first control pressure and pressure forces on the first and second control areas to modulate friction element pressure by opening and closing a first connection between the friction element and line pressure source and a second connection between the friction element and vent.

2. The system of claim 1, wherein the pressure control valve further comprises:

an orifice hydraulically connecting the source of feed pressure and vent; and an armature movable toward and away from the orifice in response to the magnitude of current supplied to a first solenoid, whereby the magnitude of the first control pressure is changed as the size of an opening between the orifice and armature is increased and decreased by moving the armature.

3. The system of claim 1 wherein the shift valve further comprises:

a spring;

a spool having first and second control lands spaced axially along the spool, the spool moveable along a chamber in response to control pressure and the effect of the spring, the first control land opening and closing a connection between the chamber and friction element, the second control land opening and closing a connection between the chamber and vent.

4. The system of claim 3 further comprising:

a second solenoid; and a valve hydraulically connected to the source of line pressure and vent, controlled by the second solenoid to open a first connection between the line pressure source and shift valve and alternately to close said first connection and to open a connection between the shift valve and vent.

5. A system for controlling pressure in an hydraulically actuated friction element, comprising:

a source of regulated line pressure;

a source of regulated feed pressure;

a low pressure vent;

a solenoid-operated pressure control valve hydraulically connected to the source of feed pressure and vent, responsive to current supplied to the solenoid for producing a first control pressure;

a shift valve hydraulically connected to the friction element, for alternately opening and closing a connection between the friction element and a regulator valve; and a regulator valve having a first control area continually connected hydraulically to the friction element, a second control area connected hydraulically to the shift valve, and a third control area connected to the first control pressure, responsive to pressure forces on the first, second and third control areas to modulate friction element pressure by opening and closing a first connection between the friction element and line pressure source and a second connection between the friction element and vent.

6. The system of claim 5, wherein the pressure control valve further comprises:

an orifice hydraulically connecting the source of feed pressure and vent; and an armature movable toward and away from the orifice in response to the magnitude of current supplied to a first solenoid, whereby the magnitude of the first control pressure is changed as the size of an opening between the orifice and armature is increased and decreased by moving the armature.

7. The system of claim 5 wherein the shift valve further comprises:

a spring;

a spool having first and second control lands spaced axially along the spool, the spool moveable along a chamber in response to control pressure and the effect of the spring, the first control land opening and closing a connection between the chamber and friction element, the second control land opening and closing a connection between the chamber and vent.

8. The system of claim 7 further comprising:

a second solenoid; and a valve hydraulically connected to the source of line pressure and vent, controlled by the second solenoid to open a first connection between the line pressure source and shift valve and alternately to close said first connection and to open a connection between the shift valve and vent.

9. A system for controlling pressure in hydraulically actuated friction elements, comprising:

a source of regulated line pressure;

a source of regulated feed pressure;

a low pressure vent;

solenoid-operated pressure control valves, each valve associated with a corresponding friction element, hydraulically connected to the source of feed pressure and vent, responsive to current supplied to the corresponding solenoids for producing corresponding first control pressures;

a shift valve hydraulically connected to each corresponding friction element, for alternately opening and closing a connection between the corresponding friction element and a corresponding regulator valve; and regulator valves, each regulator valve associated with a corresponding friction element, having a first control area continually connected hydraulically to the corresponding friction element, a second control area connected hydraulically to the shift valve, and a third control area connected to corresponding first control pressure, responsive to pressure forces on the first, second and third control areas to modulate the corresponding friction element pressure by opening and closing a first connection between the corresponding friction element and line pressure source and a second connection between the corresponding friction element and vent.

10. The system of claim 9, wherein each pressure control valve further comprises:

an orifice hydraulically connecting the source of feed pressure and vent; and an armature movable toward and away from the orifice in response to the magnitude of current supplied to a first solenoid, whereby the magnitude of the corresponding first control pressure is changed as the size of an opening between the orifice and armature is increased and decreased by moving the armature.

11. The system of claim 9 wherein the shift valve further comprises:

a spring;

a spool having pairs of control lands associated with each corresponding friction element, said lands spaced axially along the spool, the spool moveable along a chamber in response to control pressure and the effect of the spring, a first control land of each pair opening and closing a connection between the chamber and corresponding friction element, the second control land of each pair opening and closing a connection to vent.

12. The system of claim 11 further comprises:

a second solenoid; and a valve hydraulically connected to the source of line pressure and vent, controlled by the second solenoid to open a first connection between the line pressure source and shift valve and alternately to close said first connection and to open a connection between the shift valve and vent.

* * * * *